3,654,326
5,9-DIOXODECANOIC ACIDS AND METHODS FOR THEIR PREPARATION

Michael Rosenberger, Bloomfield, N.J., assignor to Hoffmann-La Roche Inc., Nutley, N.J.
No Drawing. Filed July 22, 1970, Ser. No. 57,362
Int. Cl. C08h 17/36
U.S. Cl. 260—413      6 Claims

ABSTRACT OF THE DISCLOSURE 5,9-dioxodecanoic acid or the 3-alkyl substituted analogs thereof are prepared from 4-optionally substituted alkyl-6-(4,4-ethylenedioxypentyl)-tetrahydropyran-2-ols by chromic acid oxidation utilizing two alternative procedures. The product, 5,9-dioxodecanoic acid or its 3-alkyl substituted analogs, are useful as a starting material in the total synthesis of optically active medicinally valuable steroids.

BRIEF DESCRIPTION OF THE INVENTION

The present invention relates to the novel compounds 5,9-dioxodecanoic acid and its 3-alkyl substituted analogs and to methods for their preparation.

In a first method, 6-(4,4-ethylenedioxypentyl)-tetrahydropyran-2-ol or a 4-alkyl substituted alkyl analog is treated with a chemical oxidizing agent in an acidic medium at a temperature in the range of from about −20° to +30° C., most preferably in the range of from about 0° to 5° C., to directly produce the product 5,9-dioxodecanoic acid or its 3-alkyl substituted analog. Suitable chemical oxidizing agents for this purpose include chromic acid which may be prepared in situ by the addition of a bichromate salt, e.g., sodium bichromate, to a reaction medium containing a strong mineral acid, e.g., concentrated sulfuric acid. After treatment with sodium bisulfite upon conclusion of the reaction, the product acid can be isolated by conventional techniques such as by extraction with an organic solvent.

In an alternate procedure, 6-(4,4-ethylendioxypentyl)-tetrahydropyran-2-ol or its 4-alkyl substituted analog, is first hydrolyzed utilizing dilute mineral acid, e.g., dilute aqueous sulfuric acid, at a temperature in the range of from about −10 to 35° C., most preferably at about room temperature, in the presence of an inert organic solvent such as a di-lower alkyl ketone, preferably acetone. The product, 6-(4-oxopentyl)-tetrahydropyran-2-ol, or its 4-alkyl substituted analog, so-obtained may be oxidized with the chemical oxidizing agent previously described. The main advantage for utilizing this two-step procedure over the previously described one-step procedure is the fact that it affords a more economic use of the chemical oxidizing agent.

The products are useful starting materials in the total synthesis of optically active, medicinally valuable steroids. For example, they can be utilized as a substrate for microbiological reduction in a manner described in detail in U.S. patent application Ser. No. 57,371 filed of even date herewith, entitled Microbiological Preparation of Optically Active 9-Oxo-5(S)-Hydroxy-Decanoic Acid and the Lactone thereof, inventors Julius Berger and Michael Rosenberger, so as to produce optically active 9-oxo-5-hydroxydecanoic acid lactone or its 3-alkyl substituted analog. This product may then be employed in a total synthesis scheme as described in U.S. pat. application Ser. No. 57,372 filed of even date herewith, entitled Tricyclic Oxygen Heterocyclics and Methods for Their Preparation, inventor, Gabriel Saucy.

As used herein, the term "alkyl" is meant to include straight or branched chain hydrocarbon radicals having from 1 to 7 carbon atoms, such as methyl, ethyl, propyl, i-propyl, butyl, pentyl, and the like. A preferred alkyl group for purposes of this invention is methyl.

The following examples further illustrate the invention. All temperatures are in degrees centigrade, unless otherwise mentioned.

Example 1

6-(4,4-ethylenedioxypentyl)-tetrahydropyran-2-ol (102 g.) was dissolved in acetone (1000 ml.) and cooled to 0° C.

A solution of chromic acid (1000 ml.; prepared from sodium bichromate bishydrate (100 g.), concentrated sulfuric acid (70.8 ml.), made up to 250 ml. with water) was added over 40 minutes.

The mixture was then stirred at room temperature for 18–24 hours and then treated with aqueous sodium bisulfite solution (20%; 500 ml.) followed by saturated brine (1000 ml.).

The aqueous phase was re-extracted with more acetone (4× 1000 ml.) and the combined acetone extracts were taken to dryness in vacuo.

The residue was dissolved in methylene chloride and dried over magnesium sulfate.

Removal of the solvents in vacuo and crystallization of the residue from isopropyl ether yielded the pure 5,9-dioxodecanoic acid (45 g.), M.P. 78°–80° C.

The infrared spectrum showed strong bands at 3100 (broad) and 1710 cm.$^{-1}$ (aliphatic carbonyl and carboxy group).

Calcd. for $C_{10}H_{16}O_4$ (percent): C, 59.98; H, 8.06. Found (percent): C, 60.15; H, 7.96.

Example 2

6-(4,4-ethylenedioxypentyl)-tetrahydropyran-2-ol (30 g.) in acetone (150 ml.) was treated with dilute aqueous sulfuric acid (75 ml.; 0.5 N) at room temperature and left at this temperature for 2 hours. Dichloromethane (200 ml.) was added and the organic phase was separated, washed with aqueous sodium bicarbonate solution, dried over magnesium sulfate and then taken to dryness in vacuo. The 6-(4-oxopentyl)-tetrahydropyran-2-ol (21.9 g.) showed strong bands in the infrared spectrum (film) at 3400 (hydroxyl) and 1710 cm.$^{-1}$ (aliphatic carbonyl).

Without further purification this material was dissolved in acetone (110 ml.) and oxidized with the same chromic acid mixture (88 ml.) as described in Example 1. Workup as before yielded pure 5,9-dioxodecanoic acid (13.6 g.), M.P. 78–80° C.

Example 3

3-methyl glutaraldehyde (114 g.; freshly distilled) was dissolved in tetrahydrofuran (500 ml.) and cooled to −45° C. A fresh solution of 4,4-ethylenedioxypentyl-1-magnesium chloride (prepared from 4,4-ethylenedioxy-1-chloropentane (180 g.) and magnesium (26 g.) in tetrahydrofuran (1,000 ml.) was added over a period of 30 min.; the temperature was held between −40° to −50° and the mixture was then stirred at room temperature for 1½ hours. Aqueous ammonium chloride solution (10%; 500 ml.) was added followed by glacial acetic acid (enough to produce two definite layers; pH ∼8) and the mixture was extracted with more tetrahydrofuran. Removal of the solvents in vacuo yielded the crude tetrahydropyranol as a mobile liquid. Distillation using a molecular still yielded pure 6-(4,4-ethylenedioxypentyl)-4-methyl-tetrahydropyran-2-ol. B.P. 130–140° at 0.1 mm. The product showed strong bands in the infrared spectrum at γ3600, 3400, 1040 and 1070 cm.$^{-1}$ (chloroform solution).

Example 4

6-(4,4-ethylenedioxypentyl) - 4 - methyl - tetrahydropyran-2-ol (11 g.) dissolved in acetone (100 ml.) was cooled to 0° and treated with a freshly prepared solution of Jones chromic acid reagent (100 ml.) over 20 minutes. The mixture was then stirred a further 10 hours at room temperature, quenched with an aqueous sodium bisulfite solution and extracted with dichloromethane. Removal of the solvents in vacuo yielded 3-methyl-5,9-dioxodecanoic acid as a wax. Chromatography on silica gel yielded the pure material having bands in the infrared spectrum at 3200 and 1710 cm.$^{-1}$ (chloroform solution).

Example 5

A solution of 2,2-ethylenedioxy-5-chloropentane in tetrahydrofuran (THF) (50 ml.; 164 g. in 1600 ml. THF) was added to magnesium (38 g.) activated with a crystal of iodine. This mixture was stirred and heated at reflux until the reaction commenced. The rest of the chloroketal solution was then added over approximately 1 hour to sustain gentle reflux. After complete addition, the mixture was stirred at room temperature for a further 2 hours.

A solution of freshly distilled glutaraldehyde (110 g.) in THF (1000 ml.) cooled to −40° was treated with the above Grignard reagent (as rapidly as possible) and then stirred 30 min. at −30° and a further 1 hour at 0°. Aqueous ammonia chloride solution (300 ml.; 25%) was then added and the products were isolated with ether. Removal of the solvents in vacuo gave the product as a mobile liquid (185 g.). This material was stirred at 50° with aqueous sodium sulfite solution (1500 ml.; 20%) and the pH was adjusted first to pH 6.5 with acetic acid and then pH 7.5 with sodium hydroxide solution (20%). The aqueous phase after stirring for 1 hour at 50° was extracted with ether and then treated with caustic soda solution (20%) to pH 12. Extraction with benzene then furnished the product 6-(4,4′-ethylenedioxypentyl)-tetrahydropyran-2-ol (118 g.) as a mobile, pale yellow liquid.

A sample was distilled (molecular still) to give a colorless product, B.P. 130–132°/ .1 mm.

*Analysis.*—Calcd. for $C_{12}H_{00}O_4$ (percent): C, 62.58; H, 9.63. Found (percent): C, 62.66; H, 9.77.

I claim:
1. 5,9-dioxodecanoic acid.
2. 3-loweralkyl-5,9-dioxodecanoic acid.
3. The compound of claim 2 which is 3-methyl-5,9-dioxodecanoic acid.
4. A process for the preparation of 5,9-dioxodecanoic acid or its 3-alkyl analog which comprises treating 6-(4,4-ethylenedioxypentyl)-tetrahydropyran-2-ol or its 4-alkyl analog with a chemical oxidizing agent in the presence of a strong mineral acid.
5. The process of claim 4 wherein the 6-(4,4-ethylenedioxypentyl)-tetrahydropyran-2-ol or its 4-alkyl analog is first treated with dilute mineral acid to effect hydrolysis of the ketal followed by treatment with the said chemical oxidizing agent.
6. The process of claim 4 wherein said chemical oxidizing agent is chromic acid and said mineral acid is sulfuric acid.

References Cited

FOREIGN PATENTS 1,009,621  11/1965  Great Britain _____ 260—413

OTHER REFERENCES

Chem. Abstracts, 62:11682b.

LEWIS GOTTS, Primary Examiner

E. G. LOVE, Assistant Examiner

U.S. Cl. X.R.

195—51; 260—345.9